United States Patent [19]
Martin et al.

[11] Patent Number: 5,634,412
[45] Date of Patent: Jun. 3, 1997

[54] METHOD FOR REGULATING THE FURNACE IN INCINERATION PLANTS IN PARTICULAR IN REFUSE INCINERATION PLANTS

[75] Inventors: Johannes Martin, Munich; Peter Spichal, Greifenberg, both of Germany

[73] Assignee: Martin GmbH fuer Umwelt- und Energietechnik, Munich, Germany

[21] Appl. No.: 512,484

[22] Filed: Aug. 8, 1995

[30] Foreign Application Priority Data

Aug. 9, 1994 [DE] Germany ............. 44 28 159.5

[51] Int. Cl.⁶ ................................................ F23K 3/00
[52] U.S. Cl. ............................................... 110/101 CA
[58] Field of Search ................. 110/101 CF, 101 CA, 110/185, 186, 190, 162

[56] References Cited

U.S. PATENT DOCUMENTS

| | | | |
|---|---|---|---|
| 3,635,085 | 1/1972 | Shimotsuma et al. | 73/340 |
| 4,483,258 | 11/1984 | John et al. | 110/162 |
| 4,517,903 | 5/1985 | Richmond et al. | 110/233 |
| 4,630,552 | 12/1986 | Lovgren | 110/101 CA |
| 4,750,437 | 6/1988 | Rouse | 110/101 CF |
| 4,782,766 | 11/1988 | Lee et al. | 110/190 |
| 4,838,183 | 6/1989 | Tsaveras et al. | 110/101 CF |
| 4,846,082 | 7/1989 | Marangoni | 110/162 |
| 4,870,912 | 10/1989 | Lee | 110/190 |
| 4,899,671 | 2/1990 | Bass | 110/190 |
| 5,113,770 | 5/1992 | Godbe et al. | 110/190 |
| 5,279,234 | 1/1994 | Bender et al. | 110/162 |
| 5,370,715 | 12/1994 | Kortzeborn et al. | 48/197 R |

*Primary Examiner*—Thomas N. Moulis
*Attorney, Agent, or Firm*—McAulay Fisher Nissen Goldberg & Kiel, LLP

[57] ABSTRACT

To detect a regulating quantity which is directly proportional to the combustion temperature, an infrared measuring device in the form of an infrared pyrometer is provided in the descending waste gas flue of an incineration plant and measures the temperature of the waste gases. The influence of radiation from the glowing fuel bed or the flame is excluded by arranging this measuring device in the descending waste gas flue. The temperature-dependent regulating quantity which is determined in this way can be used directly or indirectly to influence the combustion process. In a preferred application, the temperature-dependent regulating quantity serves to influence the supply of fuel and the speed of the combustion grate, while a regulating quantity derived from the mass flow of steam serves to influence the supply of primary air.

13 Claims, 1 Drawing Sheet

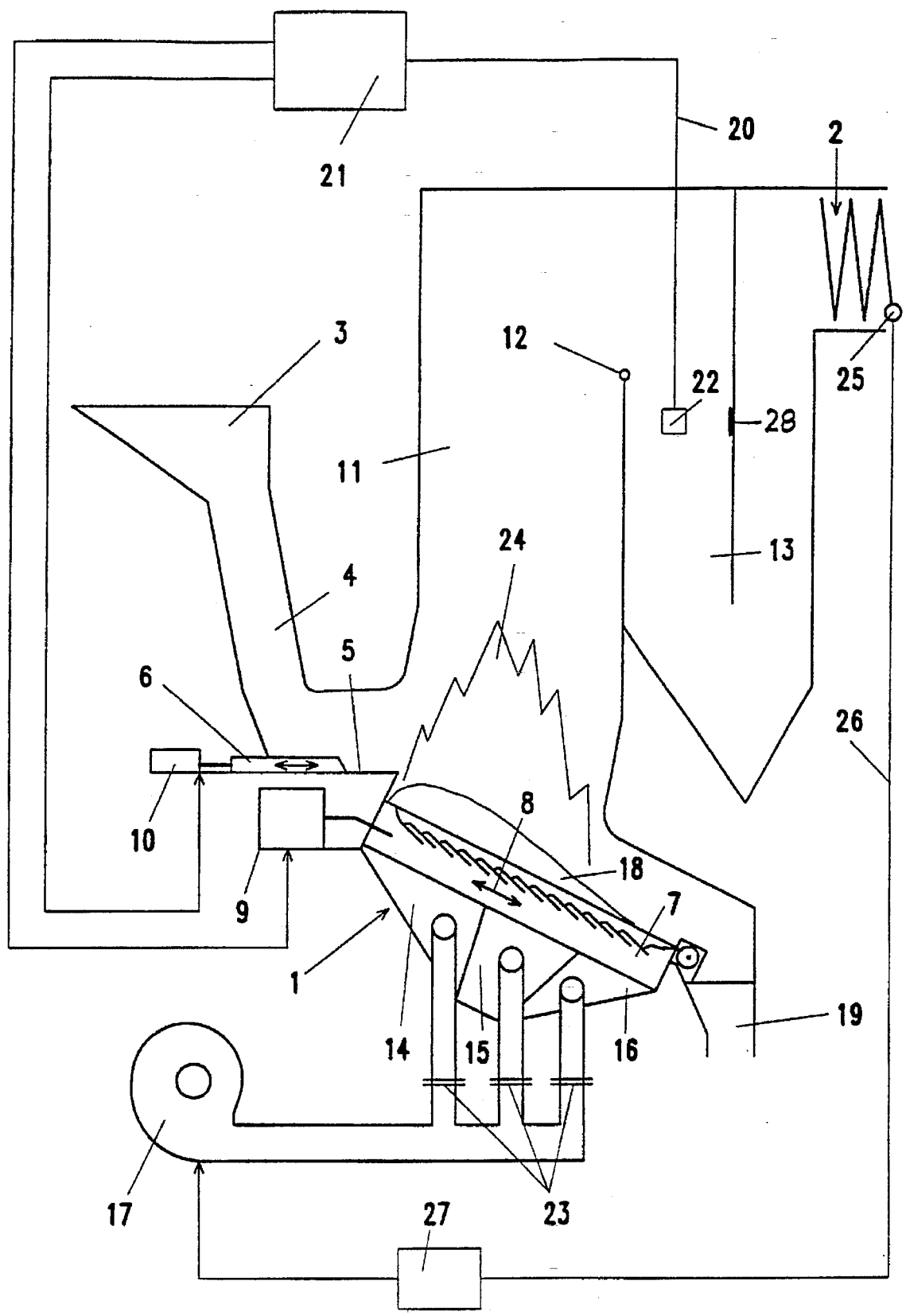

METHOD FOR REGULATING THE FURNACE IN INCINERATION PLANTS IN PARTICULAR IN REFUSE INCINERATION PLANTS

BACKGROUND OF THE INVENTION a) Field of the Invention

The invention is directed to a method for regulating the furnace in incineration plants, in particular in refuse incineration plants, in which the temperature caused by combustion is used alone or in combination with other regulating variables as a direct or indirect regulating quantity.

b) Description of the Related Art

In known regulating methods in which the combustion temperature is used either directly or indirectly as a regulating quantity, this temperature is determined in the furnace by thermal elements. However, these thermal elements are not only inaccurate, but also sluggish. A much better method for detecting the temperature in the furnace is to take measurements by means of a thermographic camera which can be used, for example, to determine the temperature distribution along the entire fuel bed. Since the thermographic camera in combination with programmable computers involves a great technological outlay and is consequently very costly, it is often dispensed with particularly when retrofitting older plants.

OBJECT AND SUMMARY OF THE INVENTION

The primary object of the present invention is to provide a means for detecting temperature which is as simple as possible with respect to technical outlay and thus inexpensive and, accordingly, enables a simple but effective regulating method for influencing the furnace. This method is particularly suitable for retrofitting older incineration plants. Accordingly, a regulating quantity is provided in a simple and reliable manner for regulating the furnace, which regulating quantity is directly dependent on the combustion temperature.

This object is met, according to the invention, in that the temperature of the flue gases or waste gases is measured directly or indirectly by means of an infrared measuring device at a location which is shielded from the fuel bed radiation and/or the flame radiation in order to detect this temperature-dependent regulating quantity. In this way, the influences of solids radiation proceeding from the glowing fuel bed and influences resulting from the flame radiation are eliminated so that a regulating quantity is obtained which is very precisely proportional to the temperature occurring in combustion. All processes which were previously regulated in direct or indirect dependence on the combustion temperature can be influenced on an accurate basis virtually without delay by using this regulating quantity.

In a further construction of the invention, the temperature of a comparison body which is substantially influenced in a directly proportional manner only by the waste gases can be measured by means of an infrared measuring device for the purpose of indirect measurement of the temperature of the waste gases. The comparison body whose temperature is influenced by the waste gases can be constructed as a ceramic body. In practice, it is possible, for instance, to provide the inner side of an observation door in the waste gas flue with a ceramic plate serving as a comparison body. This construction has the advantage that the temperature of this comparison body is influenced only by the waste gases, while the rest of the wall parts of the waste gas flue which are penetrated by water pipes of the boiler system are not suitable for such an arrangement of a comparison body because cooling is effected by the water pipes. The observation door is, of course, free of such water pipes. Accordingly, the comparison body is inserted into the wall of the waste gas flue without being exposed to influences other than those of the waste gases.

However, it is also possible for the waste gas flow to flow all around the comparison body in the waste gas flue. For example, this can be achieved by suspending the comparison body in the waste gas flue.

A particularly good shielding against interfering effects of radiation when detecting the temperature-dependent regulating quantity is achieved in an incineration plant with an ascending waste gas flue and a descending waste gas flue adjoining the deflecting edge in that the temperature of the waste gases or the temperature of the comparison body is measured in the descending waste gas flue. The influences of radiation proceeding from the fuel bed or flame are extensively excluded in this region.

The temperature of the waste gases can be measured by means of an infrared measuring device measuring in the spectral region of approximately 4.5 μm. The temperature of the comparison body can be measured by means of an infrared measuring device measuring in the spectral region of approximately 1.4 μm. In practice, an infrared radiation pyrometer KT19.61 and KT19.62, available from Helmann, was used to measure the waste gas and a radiation pyrometer PB51, available from Keller, was used to measure the temperature of the comparison body.

After it became clear that the former conventional measurement of the combustion temperature was extremely unsatisfactory and accordingly led to unsatisfactory regulating results, the development mentioned above, that of installing thermographic cameras along with the required technical outlay, was put into effect. Although this led to very good results, the cost trend was often too high.

Owing to the basic method according to the invention discussed in the preceding, it is now possible to provide a regulating method for an incineration plant which is especially advantageous when more limited investment capital available or when an older plant is to be modernized.

In a preferred construction, the method according to the invention is characterized in that the temperature-dependent regulating quantity measured in the waste gas serves to regulate the fuel supply and/or the combustion grate velocity and in that the supply of primary air is regulated as a function of the mass flow of steam.

The use of the mass flow of steam as a regulating quantity for influencing the primary air or the fuel supply is just as well known in general as, for example, the use of $O_2$ content in the waste gas. However, it is now evident that the combination proposed here, in which the regulating quantity, known per se, based on the mass flow of steam is used in connection with the temperature-dependent regulating quantity obtained according to the invention, leads to surprisingly good results with low investment, especially since the devices for deriving the regulating quantity based on the mass flow of steam are often already available in older incineration plants.

The invention is explained more fully in the following with reference to an embodiment example which is shown schematically in the drawing.

BRIEF DESCRIPTION OF THE DRAWING

The sole drawing illustrates, in schematic form, a section through an incineration plant in accordance with the invention.

DESCRIPTION OF THE PREFERRED EMBODIMENT

As will be seen from the schematic drawing, an incineration plant has a furnace 1 and a boiler 2. The furnace 1 has a charging hopper 3 with adjoining delivery chute 4, a delivery table 5 and charging rams 6 which feed the garbage falling down the delivery chute 4 to a furnace grate 7 via the delivery table. In the example shown in the drawing, this furnace grate 7 is constructed as a reciprocating grate and can execute stoking movements corresponding to the double arrow 8. The drive of the furnace grate 7 is designated by 9. The drive for the charging rams 6 is designated by 10. Further, the furnace has an ascending waste gas flue 11 and a descending waste gas flue 13 adjoining a deflecting edge 12. The hot waste gases pass via the waste gas flue 13 to the boiler 2 arranged downstream and to other devices, e.g., waste gas cleaning systems, not shown. Individual underfire air zones 14, 15 and 16 which are acted upon by a common fan 17 are located below the furnace grate 7. Regulating devices 23 and feed lines leading to the underfire air zones are provided in order to distribute the primary air which is fed from below to the individual underfire air zones as needed.

The fuel or combustible material located on the furnace grate 7 forms the fuel bed 18 and the ash occurring at the end of the furnace grate falls into an ash drop chute 19.

According to the shown embodiment example, the combustion temperature or a temperature directly proportional thereto on the one hand and the mass flow of steam on the other hand are used as regulating quantities for regulating the furnace or furnace output. In so doing, the combustion temperature is detected by measuring the waste gas temperature or a comparison body 28 influenced in a directly proportional manner by the waste gas temperature, and this combustion temperature is supplied to a regulator 21 as regulating quantity 20. An infrared measuring device 22 which is arranged, according to the invention, in the descending waste gas flue 13 is used to detect the regulating quantity 20. This step is taken in order to exclude interference resulting from radiation of the fuel bed 18 or flames 24 in measuring the temperature of the waste gases. The regulator 21 regulates the fuel supply, i.e., the amount of garbage to be delivered per unit of time, by acting upon the drive 10 for the charging rams 6. Further, the drive 9 for the stoking speed of the furnace grate 7 can also be regulated proceeding from regulator 21 in order to influence the distribution and movement speed of the fuel in the fuel bed 18 on the furnace grate 7.

At the same time, the mass flow of steam $m_D$ is measured at 25 and this regulating quantity 26 is fed to an additional regulator 27 which influences the output of the fan 17 and accordingly the amount of primary air as a whole and/or the regulating devices 23 of the primary air to the individual grate zones associated with the underfire air zones 14, 15, 16.

The method just described is only one of a number of examples showing that it is possible to derive a regulating quantity proportional to the combustion temperature for influencing the combustion process by simple steps. In the shown embodiment example, the temperature-dependent regulating quantity is used to influence the fuel supply and is combined with another regulating quantity which is derived from the mass flow of steam and serves to influence the supply of primary air. Of course, the temperature-dependent regulating quantity can also be combined with regulating quantities other than the mass flow of steam.

Moreover, it is also possible for the temperature-dependent regulating quantity to be used only indirectly to influence the combustion process, rather than directly, e.g., to influence the fuel supply. This is the case, e.g., in DE 38 25 933 C2 for influencing the $O_{2-moist}$ reference value. In this reference, a predetermined $O_{2-moist}$ reference value is changed as a function of furnace temperature. The present invention accordingly makes it possible to detect a regulating quantity which is directly proportional to the combustion temperature and determines changes in the combustion process which manifest themselves as changes in the combustion temperature in a precise manner and without delays.

While the foregoing description and drawings represent the preferred embodiments of the present invention, it will be obvious to those skilled in the art that various changes and modifications may be made therein without departing from the true spirit and scope of the present invention.

What is claimed is:

1. A method for regulating the furnace in incineration plants, in particular in refuse incineration plants, in which the temperature caused by combustion is used alone or in combination with other regulating variables as a direct or indirect regulating quantity, said method comprising the steps of:

measuring the temperature of the waste gases directly or indirectly by an infrared measuring device at a location which is shielded from the fuel bed radiation and/or the flame radiation in order to detect this temperature-dependent regulating quantity.

2. The method according to claim 1, further including the step of measuring the temperature of a comparison body which is substantially influenced in a directly proportional manner only by the waste gases by an infrared measuring device for the purpose of indirect measurement of the temperature of the waste gases.

3. The method according to claim 2, including the step of constricting the comparison body whose temperature is influenced by the waste gases as a ceramic body.

4. The method according to claim 3, including the step of inserting the comparison body in a wall of the waste gas flue.

5. The method according to claim 3, including the step of holding the comparison body in the waste gas flue so that the waste gas flows all around it.

6. The method according to claim 2 for application in an incineration plant with an ascending waste gas flue and a descending waste gas flue adjoining a deflecting edge, comprising the step of measuring the temperature of the waste gases or the temperature of the comparison body in the descending waste gas flue.

7. The method according to claim 1, including the step of measuring the temperature by an infrared pyrometer.

8. The method according to claim 2, including the step of measuring the temperature by an infrared pyrometer.

9. The method according to claim 7, including the step of measuring the temperature of the waste gases by an infrared measuring device measuring in the spectral region of approximately 4.5 μm.

10. The method according to claim 8, including the step of measuring the temperature of the comparison body by an infrared measuring device measuring in the spectral region of approximately 1.4 μm.

11. The method according to claim 1, wherein the measuring of the temperature-dependent regulating quantity in the waste gas serves to regulate the fuel supply and/or the combustion grate velocity and further including the step of regulating the supply of primary air as a function of mass flow of steam.

12. The method according to claim 2, wherein the measuring of the temperature-dependent regulating quantity in the waste gas or at the comparison body serves to regulate the fuel supply and/or the combustion grate velocity and further including the step of regulating the supply of primary air as a function of mass flow of steam.

13. The method according to claim 1 wherein the furnace has a waste gas flue extending from the furnace, said location being in said waste gas flue downstream of said furnace, said measuring the temperature of the waste gases being performed in said waste gas flue.

* * * * *